(12) United States Patent
Velez

(10) Patent No.: US 11,309,731 B1
(45) Date of Patent: Apr. 19, 2022

(54) SOLAR POWERED SMART DEVICE

(71) Applicant: Martin Velez, Fort Lauderdale, FL (US)

(72) Inventor: Martin Velez, Fort Lauderdale, FL (US)

( * ) Notice: Subject to any disclaimer, the term of this patent is extended or adjusted under 35 U.S.C. 154(b) by 2 days.

(21) Appl. No.: 16/822,008

(22) Filed: Mar. 18, 2020

Related U.S. Application Data

(60) Provisional application No. 62/925,904, filed on Oct. 25, 2019.

(51) Int. Cl.
*H01M 10/46* (2006.01)
*H02J 7/35* (2006.01)
*H02J 7/00* (2006.01)

(52) U.S. Cl.
CPC ............. *H02J 7/35* (2013.01); *H02J 7/0044* (2013.01)

(58) Field of Classification Search
CPC .......... H02J 7/35; H02J 7/0044; H02J 7/0045; H02J 7/0042
USPC ........ 320/101, 107, 114, 115, 132; 136/244, 136/291, 293
See application file for complete search history.

(56) References Cited

U.S. PATENT DOCUMENTS

| | | | | |
|---|---|---|---|---|
| 5,777,903 A | * | 7/1998 | Piosenka | G06K 19/0704 708/100 |
| 2008/0143291 A1 | * | 6/2008 | Lin | H02J 7/35 320/101 |
| 2015/0256026 A1 | * | 9/2015 | Rybkiewicz | H02J 7/35 320/101 |
| 2016/0028272 A1 | * | 1/2016 | Dukes | H02J 7/35 320/101 |
| 2017/0187233 A1 | * | 6/2017 | Wilkinson | G06F 1/1635 |
| 2019/0096965 A1 | * | 3/2019 | Mairs | H01L 27/3227 |
| 2019/0341956 A1 | * | 11/2019 | Coverstone | H02J 7/342 |
| 2019/0363792 A1 | * | 11/2019 | Tsonev | G09G 3/32 |

FOREIGN PATENT DOCUMENTS

| | | | | | |
|---|---|---|---|---|---|
| CN | 203073374 U | * | 7/2013 | | H02J 7/35 |
| FR | 3017974 | * | 2/2015 | | |
| GB | 2448774 A | * | 10/2008 | | H02S 99/00 |
| WO | WO-2009037386 A1 | * | 3/2009 | | H02J 7/35 |

OTHER PUBLICATIONS

Miles, Stuart, "Transparent Solar Panel Display Charges Your Phone through the Screen," Pocket-lint, Jan. 6, 2014. (Year: 2014).*
Solar Magazine, "Transparent Solar Panels: Reforming Future Energy Supply," Feb. 29, 2020. p. 3, third paragraph. (Year: 2020).*
Husain et al. "A Review of Transparent Solar Photovoltaic Technologies," Renewable and Sustainable Energy Reviews 94 (2018) 779-791, Jul. 6, 2018. p. 781, section 2. (Year: 2018).*

* cited by examiner

*Primary Examiner* — Edward Tso

(57) ABSTRACT

Solar Powered display screen for electronic devices including but not limited to smart phones, media players, portable radios . . . is disclosed. Expands battery life of a battery and product usage and can produce two way radio for emergency purposes. (The two way radio is optional).

5 Claims, 1 Drawing Sheet

SOLAR POWERED SMART DEVICE

The following detailed description is of the best currently contemplated modes of carrying out exemplary embodiments of the invention. The description is not to be taken in a limiting sense, but is made merely for the purpose of illustrating the general principles of the present invention.

Figure 1:
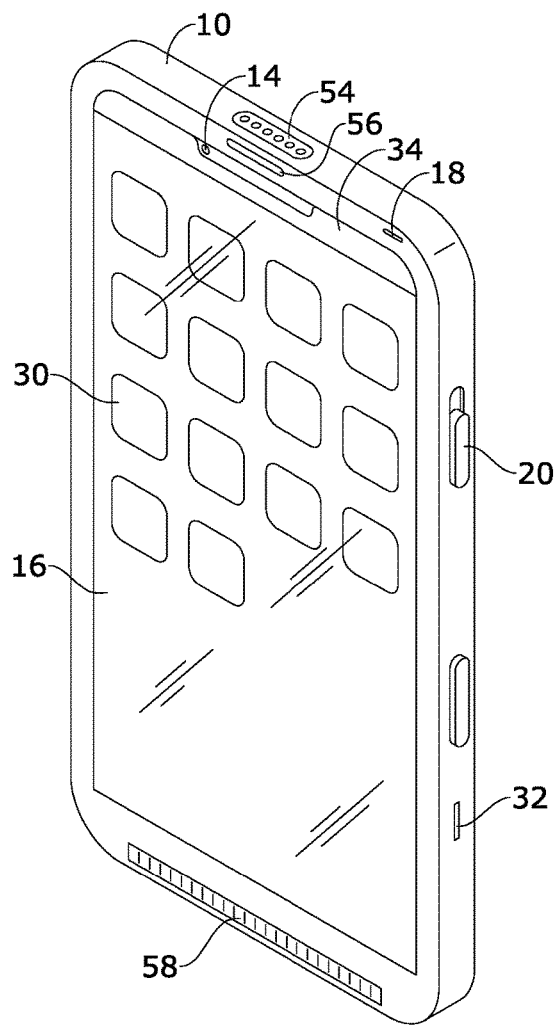
FIG. 1 is a top perspective view of an exemplary embodiment of the present invention.
Figure 2:
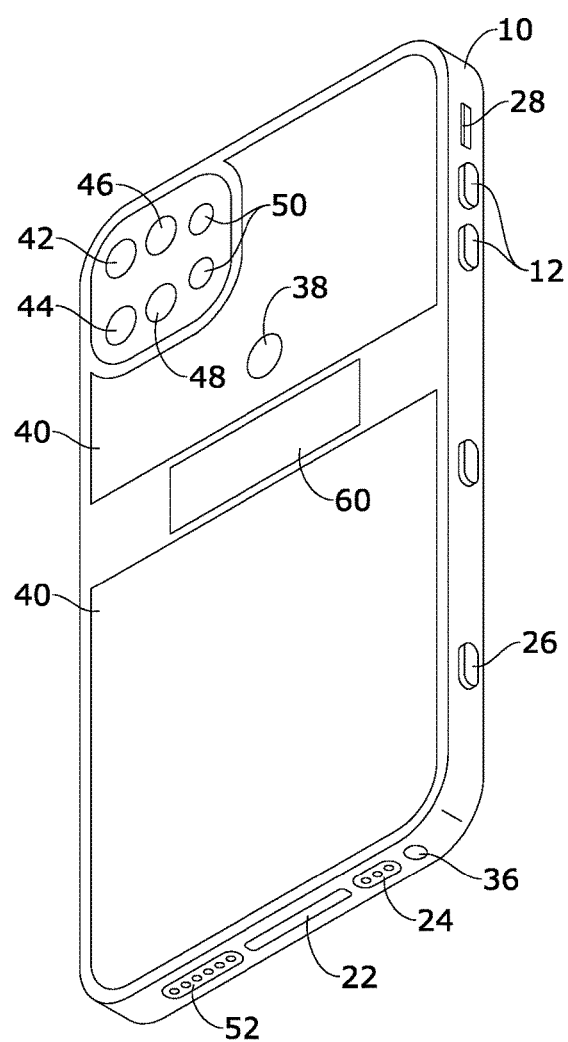
FIG. 2 is a bottom perspective view of an exemplary embodiment of the present invention.

Referring now to FIGS. 1 and 2, the present invention may include at least one computer with a user interface. The computer may include at least one processing unit coupled to a form of memory. The computer may include, but not limited to, a microprocessor, a server, a desktop, laptop, and a smart device, such as a tablet and a smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The user interface on smart devices 10, typically limited to receiving haptic input and input and visual output. The present invention embodies a transparent solar panel screen 16 for integrating with or covering the intrinsic display screen of the smart device 10. This is advantageous because typically smart devices 10 are exposed to solar radiation only or mostly when in use, and when in use their display screen is almost always in an upward-facing/user-facing orientation. Thus, the display screen receives the most sunlight compared to other portions of the smart device. Specifically, the rear portion of the smart device, when exposed (i.e., when in use) for possible collection of solar radiation, is typically downward facing, away from the sun. Furthermore, the remaining portions of smart devices (think: side walls) tend to be too small to provide meaningful solar power panel sizes.

With that said, the present invention may also include rear solar panels (transparent or opaque) 40. Both solar panel types 16 and 40 may be operatively associated with an intrinsic rechargeable battery of the smart device, house therein. Also housed in the smart device 10 may be a solar charge controller adapted to regulate the amount of current the photovoltaic modules feed into an associated battery bank, functioning to prevent overcharging of the batteries, but to charge controllers also block battery bank current from leaking back into the photovoltaic.

The present invention encompassed a solar-powered smart phone and media player in one 10. The smart phone/media player would be powered by the solar panels and rechargeable backup battery. The media player would be good to watch music videos and make your own music videos, including a hologram version as well pairing with others and lighting background features in sound effects. Such a smart device 10 include the following: volume buttons 12, front-facing camera 14, built-in antenna 18, walkie-talkie button 20, connector port 22, bottom microphone 24, backup battery/solar panel check button 26, silent mode switch 28, application icons on the multitouch display 30, SIM card slot 32, status bar 34, headphone jack 36, sleep/wake power button 38, camera lens 42, video camera lens 44, cartoon video lens 46, age shifting camera/video lens 48, dual flashlight 50, Bottom speaker 52, top speaker 54, receiver/front microphone 56, battery/solar panel status light 58, and a logo area 60. Walkie-talkie functionality is optional, and may have a walkie-talkie range of 10 to 15 miles radius. The case, frame, and solar panel 16 and 44 of the smart device 10 can be waterproof. The smart device 10 embodied by the present invention enables users to communicate with others without worries that they're almost out of battery to make a call or make a music video or use the media player when they want to for their own entertainment purposes. Additionally, the present invention can be used as a computer with internet services and a two-way radio.

It should be understood, of course, that the foregoing relates to exemplary embodiments of the invention and that modifications may be made without departing from the spirit and scope of the present invention.

Solar Powered Smart Device

Background of the Invention

The present invention relates to power sources for electronic devices and, more particularly, a solar power display screen for electronic smart devices, including but not limited to smart phones, media players, portable radios, and a combination thereof. Additionally, the present invention may include a solar-powered electronic device embodying a cell phone, media player, and a portable radio all in one.

In emergency situations, when there is no power available for charging one's like electronic devices, such as a cell phone, media player, portable radio or the like, to have access to a renewed energy source, such as solar power. Otherwise, all electronic components, for all their potential, would be inoperable as their battery would not last long without a backup power source.

As can be seen, there is a need for either a solar power display screen for electronic smart devices, including but not limited to smart phones, media players, portable radios, and a combination thereof, or a solar-powered electronic device embodying a cell phone, media player, and a portable radio all in one. The present invention is adapted to be charged by solar panels and an electrically coupled backup battery, thereby expanding the battery life and overall product usage of the associated electronic device. Colloquially, the present invention is known as "Solar Tunes" and a "solar powered cell phone".

What is claimed is:

1. An apparatus for providing power to electronic device having a front side including an electronic display screen, and rear side, and a battery, said apparatus comprising:
    a transparent first solar panel integrated with the electronic display;
    a second solar panel disposed on the rear side of the electronic device;
    said second solar panel including first and second sections disposed in spaced relation;
    each of said first and second solar panels in electric communication with the battery; and
    whereby the exposure of either of said first and second transparent solar panels to solar radiation generates electrical power for the battery.

2. The apparatus of claim 1 further including a status light adapted to provide visual indication of the amount of electrical energy generated by said transparent solar panel.

3. The apparatus of claim 1 wherein said second solar panel is opaque.

4. The apparatus of claim 1 wherein said second solar panel is transparent.

5. An apparatus for providing power to electronic device having a front side including an electronic display screen, and rear side including a manufacturer's indica, and a battery, said apparatus comprising:
- a transparent first solar panel disposed integrated with the electronic display;
- a transparent second solar panel disposed on the rear side of the electronic device and disposed in overlapping relation with the rear side and the manufacturer's indicia;
- each of said first and second solar panels in electric communication with the battery; and
- whereby the exposure of either of said first and second transparent solar panels to solar radiation generates electrical power for the battery.

\* \* \* \* \*